United States Patent
Aarts et al.

(10) Patent No.: US 6,705,375 B2
(45) Date of Patent: Mar. 16, 2004

(54) SEALING DEVICE

(75) Inventors: Anna Maria Aarts, Belfeld (NL); Marcel Freriks, Molenbeersel (BE); Johannus Henricus Renkens, Weert (NL); Johan Henricus Van De Rijt, Weert (NL)

(73) Assignee: Pieter Theodorus Joseph Aquarius, Stramproy (NL)

( * ) Notice: Subject to any disclaimer, the term of this patent is extended or adjusted under 35 U.S.C. 154(b) by 51 days.

(21) Appl. No.: 10/128,315

(22) Filed: Jul. 15, 2002

(65) Prior Publication Data

US 2003/0183346 A1 Oct. 2, 2003

(30) Foreign Application Priority Data

Mar. 28, 2002 (NL) .............................................. 1020273

(51) Int. Cl.[7] ................................................. B30B 5/06
(52) U.S. Cl. .................... 156/555; 156/308.2; 156/582; 156/583.5
(58) Field of Search .......................... 156/308.2, 309.6, 156/555, 580, 582, 583.1, 583.5; 100/327, 330, 155 R, 160, 176

(56) References Cited

U.S. PATENT DOCUMENTS 6,213,183 B1 * 4/2001 Kerr et al. .................. 156/358
6,435,247 B1 * 8/2002 Kerr ............................ 156/555

* cited by examiner

*Primary Examiner*—James Sells
(74) *Attorney, Agent, or Firm*—Young & Thompson

(57) ABSTRACT

The present invention relates to a sealing device for using heat to form a weld between a first layer of plastic and a second layer of plastic, provided with heating means for heating the layers of plastic and conveyor means for conveying the layers of plastic past the heating means, and separation means for forming a separating layer between the heating means and the layers of plastic while the latter are being heated, the separation means being displaceable in the direction of movement of the layers of plastic past the heating means. The sealing device according to the invention is characterized in that preheating means are provided for the purpose of preheating the separation means before they are fed to the heating means.

21 Claims, 4 Drawing Sheets

SEALING DEVICE

The present invention relates to a sealing device for using heat to form a weld between a first layer of plastic and a second layer of plastic, provided with heating means for heating the layers of plastic and conveyor means for conveying the layers of plastic past the heating means, and separation means for forming a separating layer between the heating means and the layers of plastic while the latter are being heated, the separation means being displaceable in the direction of movement of the layers of plastic past the heating means.

A device of the type which is described in the preamble is known from Dutch patent NL 1015127. The sealing device according to the prior art is provided with heating means which are designed as a sealing wire. This sealing wire is held taut between two stationary sealing elements which are responsible for supplying current to the sealing wire. The sealing wire is made from resistor material and will become hot when current is passed through it. The width of the sealing wire is a few millimetres. This width corresponds to the width of the weld which is to be formed between a first layer of plastic and a second layer of plastic. Beneath the sealing wire, there is a support block allowing pressure to be exerted on the layers of plastic which are guided through beneath the sealing wire.

In use, two layers of plastic are guided through beneath the sealing wire. The heat which is introduced into the layers of plastic will cause the plastic to at least partially melt, so that bonding can take placed between the first and second layers. If no further measures were to be taken, the molten plastic material could stick to the sealing wire. Therefore, what are known as separation means are described in NL 1015127. These separation means are designed as a teflon strip which is guided in an endless loop around the heating means by the device. In use, the speed of movement of the teflon strip is the same as that of the layers of plastic which are moved through beneath the sealing wire, i.e. the teflon strip is stationary with respect to the plastic layers and moves over the sealing wire. The teflon is able to withstand the relatively high temperature of the sealing wire and will not melt as a result of the introduction of heat. The presence of the teflon strip substantially avoids the problem of possible sticking of the plastic material to the sealing wire or to the sealing elements between which the wire is held taut.

According to the prior art, the plastic belt or strip is guided underneath a sealing wire via guide rolls. After it has left the downstream section of the sealing wire, the teflon strip will be guided back to the upstream start of the sealing wire via the rolls. While it is being conveyed, the teflon strip will cool and will return to ambient temperature. From initial contact between the sealing wire and the teflon strip, the teflon will have to be heated from ambient temperature until the temperature of the teflon is the same as the temperature of the sealing wire itself. Then, the heat is transferred to the plastic below it by the teflon. It is desirable to keep the sealing wire as short as possible, i.e. within a relatively short distance it is necessary both to heat the teflon and to supply heat to the plastic layers below it. Therefore, a relatively high temperature of the sealing wire is used. Since a relatively high temperature is used, what is known as a hot spot will occur at the downstream end of the sealing wire. Both the teflon and the plastic below it are heated with the aid of the sealing wire over the downstream section. The sealing wire cannot readily release heat at the location of the hot spot. This leads to the sealing wire being subjected to thermal loads at the location of the hot spot and to the teflon material and the plastic layers below it being excessively heated at this location. Furthermore, dust and dirt will bake on at the hot spot. This dirt is relatively sharp. The teflon strip which runs passed this sharp dirt will as a result become worn more rapidly. This represents a drawback.

In view of the drawbacks of the prior art, the object of the present invention is to provide a device of the type described in the preamble in which the above drawbacks are avoided as far as possible.

According to the invention, this object is achieved by the fact that preheating means are provided for the purpose of preheating the separation means before they are fed to the heating means.

According to the invention, it is provided that the separation means, which are designed, for example, as a teflon belt or strip, are preheated at a section which lies upstream of the heating means. When the layers of plastic, together with the separation means, reach the heating means, the separation means are already preheated. This means that the heat which is fed to the separation means and the layers of plastic by the heating means can pass directly to the plastic layers themselves, i.e. it is possible to use a sealing wire which is at a relatively low temperature. The preheating of the separation means means that there is no need to supply excessive heat to a starting section of the heating means, i.e. a hot spot at the end of the heating means is also eliminated.

According to the invention, it is possible for the heating means to form a guide for the separation means, in which case the heating means comprise a first section for preheating the separation means which adjoins a second section for heating the layers of plastic. In this case, it is possible for the preheating means to comprise a first section for bringing the separation means up to temperature, which first section adjoins a second section for further increasing the temperature of the separation means.

According to these measures, it is possible to design the heating means as a simple sealing wire, with the separation means being guided past this sealing wire. The sealing wire may, for example, have a first section which is at a relatively low temperature and adjoins a section which is at a higher temperature, i.e. the separation means, such as for example a strip of teflon, are gradually heated from room temperature towards the temperature of the sealing wire itself. When the separation means together with the plastic reach the heating means, the separation means have been heated to such an extent that they are at a temperature which substantially corresponds to that of the sealing wire itself.

According to the invention, it is possible for the separation means to form a belt or strip which can be displaced along the heating means. In this case, it is possible for the belt or strip to comprise teflon. Furthermore, according to the invention it is possible for the belt or strip to be of endless design.

As has already been stated above, it is advantageous for the heating means to be designed as a resistor.

In this case, it is possible for the resistor to have a first section having a first resistance and a second section having a higher resistance, in order, in use, to form a first section which is at a relatively low temperature and a second section which is at a relatively high temperature.

According to the invention, it is furthermore provided that the resistor has a core of resistor material, the first section being coated with a conductive material in order to reduce the resistance at the location of the coating. According to this embodiment, the heating means are designed as a sealing wire comprising, for example, resistor material. The first section of this sealing wire is coated with a material which reduces the resistance of the material. This coating means that the resistance will be lower, and the temperature which is to be generated when current is passed through will also be lower.

According to the invention, it is possible for the coating to comprise nickel or copper.

A further preferred embodiment is characterized in that the device comprises first heating means and second heating means, which heating means are positioned opposite and at a distance from one another, so that a passage for the layers of plastic which are to be joined is formed between them. In this case, it is possible for one of the heating means to be displaceable from an active position into an inactive position.

As has already been stated above, according to the prior art it is customary for the layers of plastic which are to be sealed to be guided past heating means which run substantially parallel to a support which is used to exert pressure. A certain pressure can be exerted on the layers of plastic when they lie between the support and the heating means. According to the invention, there is provision for the support or pressure-exerting means itself to form a second heating means, i.e. for the heat to be supplied to the layers of plastic which are to be joined from both sides.

The fact that one of the heating means can be pivoted away from an active position into an inactive position means that it is possible, for example, to guide layers of plastic between the two heating elements without the heating elements being switched on.

According to the invention, it is also possible for the heating means to be designed as a strip or wire which is secured to a base surface, the wire projecting out of the base surface and the projecting section of the wire being smaller than the overall thickness of one of the plastic layers.

If the device according to the invention is used to process plastics, such as HDPE and LDPE, temperatures which cause the material to melt are generated in the vicinity of the sealing wire. The molten plastic has a low viscosity and is therefore unable to withstand compressive force. If the sealing wire which is to be used were to project too far out of a base material, the sealing wire could start to act as a blade. To prevent this, it is desirable, according to the invention, for the projection of the sealing wires to be limited, so that the material cannot be completely cut through.

According to the invention, it is also possible for the conveyor means to be arranged downstream of the heating means. In this context, it is possible for the conveyor means to comprise pressure-exerting rollers which are arranged in line with the heating means.

The layers of plastic which are to be sealed are moved past the heating means with the aid of the conveyor means. These conveyor means are, for example, in the form of plastic pressure-exerting rolls which are positioned downstream of the heating means. Use of pressure-exerting rolls which are positioned in line with the heating means enables these conveyor means to apply a certain amount of pressure to the freshly formed weld.

Furthermore, according to the invention it is possible for the device to have a supply path for the layers of plastic, which supply path comprises a turn or bend upstream of the heating means.

When a first layer of plastic is being sealed to a second layer of plastic, there is a risk of creases forming in the layers of plastic themselves. Creases of this type are detrimental to the quality of the weld which is to be formed. If the supply path upstream of the heating means is now provided with a turn or bend, it is possible to allow the layers of plastic to crease deliberately on the side which is not being sealed, so that the opposite side, which is to be provided with a seal, is automatically pulled taut.

According to the invention, it is possible for the layers of plastic to be supplied from a storage holder or roll, via a guide, the longitudinal axis of the guide forming an angle of less than 90° with the longitudinal direction of the heating means.

This measure ensures that the side which is to be sealed is held taut while a crease is automatically imposed on the opposite side.

According to the invention, it is advantageous for the angle between the longitudinal direction of the heating means and the axis of rotation to be substantially 85°.

Furthermore, the present invention relates to a sealing device which is characterized in that the device comprises a spindle on which a roll of plastic can be placed, which spindle has a first projecting end and a second end, with the aid of which the spindle is secured to the device, the spindle being provided, at the first end, with a conically shaped member with a diameter which increases from the first end towards the second end, and the spindle also having, at a distance from this end, a second conical member with a diameter which increases, as seen from the first end towards the second end, a section of the spindle of relatively small diameter being present between the two conical members.

If, by way of example, a storage roll is to be placed onto the spindle according to the present invention, the core of the storage roll is pushed over the first conical member. The conical member ensures that the roll is guided in the correct direction. Then, the roll can be pushed on until contact is made with the second conical member. This conical member may be designed in such a way that it comes to be fixed in a clamped manner against the inner side of the roll which has been positioned on it. Furthermore, the spindle will comprise a stop, in which case the distance over which the storage roll can be pushed onto the spindle can be defined by this stop.

Furthermore, the invention relates to a sealing device which is characterized in that means are provided for feeding air between the layers of plastic which are to be joined, which means comprise an outlet opening, the outlet opening decreasing in size in the direction of movement of the layers of plastic.

The sealing device according to the present invention is particularly suitable for sealing a prepared film. This film comprises a tubular film in which transverse seals are made. These seals extend from a first end side to a distance from a second end side. A tube of this type is guided into the device according to the present invention. The space which remains between the end of the transverse seal and the second end side of the film can be used to slide the film over a guide member. At the guide member, there is a blade for cutting the tube open at this location. Furthermore, the device includes pressurized-air means for allowing air to be blown between two successive transverse seals. Blowing in air will cause the tube to adopt a three-dimensional form and to bulge out to some extent. Then, the device according to the present invention is used to make a seal in the prepared material. To prevent the air which is blown in from escaping as far as possible, it is advantageous if the outlet opening of the pressurized-air means adjoins the sealing means as closely as possible. This can be achieved by using an outlet opening which decreases in size in the direction of movement of the layers of plastic which are to be joined, i.e. a relatively thin or narrow outlet opening can virtually immediately adjoin the heating means in order to form a seal between two layers of plastic.

In addition to the device described above, the present invention also relates to a method which is characterized in that the separation means are preheated before they are fed to the heating means.

The present invention will be explained in more detail with reference to the appended figures, in which.

Figure 1:
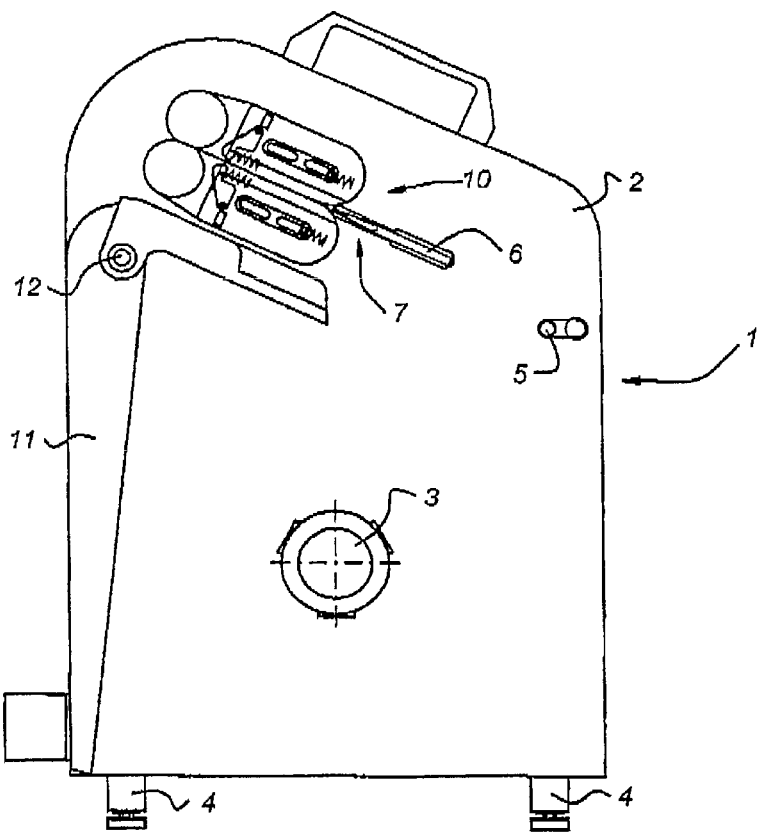
FIG. 1 shows a front view of the sealing device according to the present invention.
Figure 2:
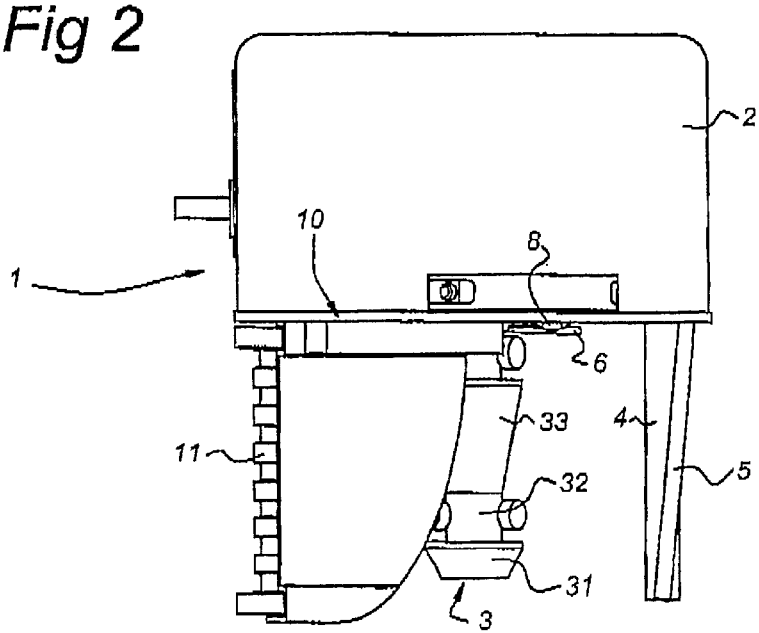
FIG. 2 shows a plan view of the device shown in FIG. 1.
Figure 4:
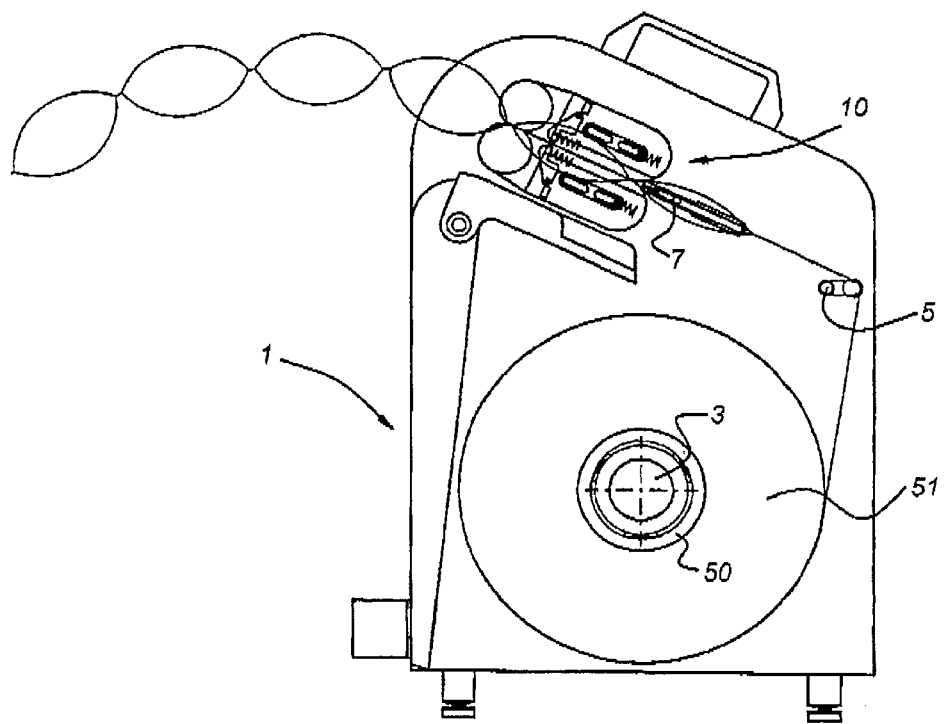

FIG. 4 diagrammatically depicts the device shown in FIGS. 1 and 2 while it is being used.

Figure 5:
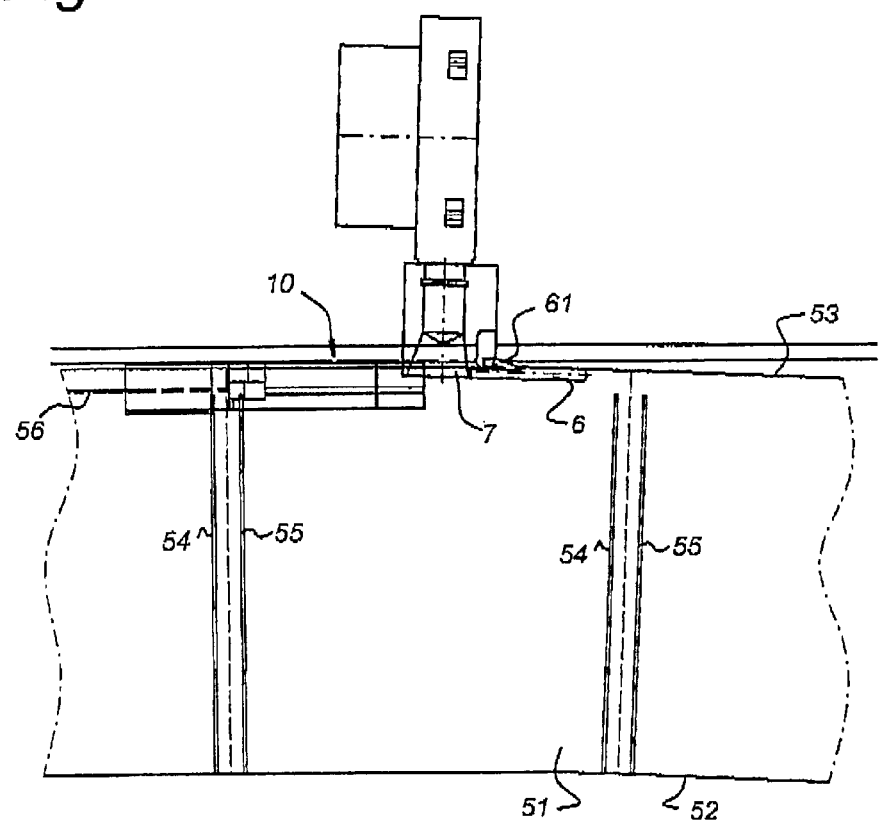

FIG. 5 shows a plan view of the device according to the invention while a strip of plastic is being sealed.

Figure 6:
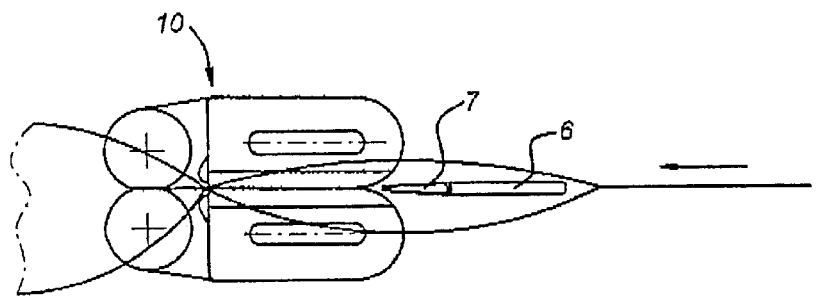

FIG. 6 shows a detailed view of the way in which the film shown in FIG. 5 is inflated.

FIG. 1 shows the sealing device 1 according to the present invention. The device 1 comprising a housing 2. As can be seen from FIG. 2, the housing has a certain depth, so that drives and the like of various components of the sealing device can be accommodated in the housing. It can be seen from FIG. 1 that various components project out of housing 2. On the underside, the housing 2 is provided with legs 4, with the aid of which the housing 2 can be placed onto a floor. The size of the legs 4 can also be seen from FIG. 2. Furthermore, a storage holder 3 projects out of the housing 2. The specific shape of the storage holder can be seen from FIG. 2. A roll of plastic which is to be sealed with the aid of the device 1 can be placed onto the storage holder 3. As is shown with reference to FIG. 4, the plastic is guided, via a guide rod 5, towards a sealing unit 10. This sealing unit 10 will be discussed with reference to FIG. 3. As can be seen from FIG. 2, the guide rod 5 is not vertical at the front of the housing 2. The guide rod 5 is positioned on the housing 2 in such a manner that the side which faces towards the sealing unit 10 includes an angle of less than 90° with the housing.

Plastic is guided from the guide rod 5 towards the sealing unit 10. This plastic will comprise a preprocessed, folded plastic tube in which transverse seams are formed. These transverse seams extend from a first end edge to a certain distance from the second end edge. The space which remains clear between the end of the transverse seams and this second end edge can be used to push the tube onto a guide member 6. This guide member 6 is also illustrated in FIG. 2. Via the guide member 6, the plastic tube runs past or a blade or perforating member for cutting open the second end edge of the plastic tube (not shown). Then, the plastic tube passes an outlet opening 7. This outlet opening is connected to compressed air, so that air can flow via the outlet opening into the tube which has been cut open. It can be seen from FIG. 1 that the outlet opening 7 decreases in size towards the sealing unit 10. This means that this outlet opening may extend as far as just in front of the sealing unit 10. The plastic strip which is inflated by means of the outlet opening 7 is then sealed with the aid of the sealing unit 10. The way in which this takes place is discussed in more detail with reference to FIG. 3. Then, the plastic is discharged from device 1 on the left-hand side of the sealing unit 10. The way in which the sealed plastic strip is discharged can be seen clearly from FIG. 4.

The device 1 is provided with a leaf or flap 11 which is connected to the device 1 via a rotation point 12. If desired, the flap 11 can be pivoted upward from the position shown in FIG. 1 in order to be able to support the strip of sealed plastic as it leaves the device 1.

FIG. 2 shows a plan view of the device 1 shown in FIG. 1. It can be seen from FIG. 2 that the storage holder 3 is shaped in a particular way. One end of the storage holder 3 is connected to the housing 2. The storage holder 3 is mounted rotatably in the housing 2. Furthermore, the storage holder 3 may be provided with a slip ring to prevent the storage holder 3 from being able to rotate undesirably with respect to the housing 2. This slip ring comprises, for example, a rubber strip which is wound around the body of the storage holder 3 and is held under a certain tension.

The opposite end of the storage holder 3 projects out of the housing 2. From this projecting end, the cross section of the storage holder 3 increases slightly over a first section 31. This means that the projecting section 31 of the storage holder 3 forms a centring member. Then, the storage holder 3 comprises a section 32 of a smaller diameter. This means that when a storage roll is placed onto the storage holder 3, it can move along this section quickly and easily. The storage holder 3 then comprises a further section 3, the cross section of which increases again, i.e. when a storage roll is being placed onto the storage holder 3 the front section of the storage holder will make contact with the outer side of the section 33, so that the storage roll is clamped onto the storage holder 3.

FIG. 2 also shows that, from the storage holder 3, a path is formed via the guide element 5 towards the guide element 6, in the vicinity of the sealing unit 10. The fact that the guide element 5 forms an angle of less than 90° with the front of the housing 2 means that a plastic strip which is supplied from the storage holder 3 towards the sealing unit 10 will be slightly creased over the section which lies at a distance from the housing 2. The section which makes contact with the guide 6 will therefore come to be under a certain tension and will be pulled completely taut. This means that a better weld can be formed by means of the sealing unit 10. Furthermore, FIG. 2 shows the bottom end of a wheel or disc 8. This wheel or disc 8 makes contact with the plastic which is guided along the guide 6, so that the speed at which the plastic is guided through the device 1 can be measured with the aid of the wheel 8. Furthermore, the wheel 8 can be connected to a processing unit, such as a computer, for monitoring the total quantity of plastic which has been sealed with the aid of the device 1. For example, it is possible that a supplier of the device 1 may provide an end user with the device 1 free of charge and only request payment for the rolls of plastic which are to be processed. At that time, the processing unit which is coupled to the disc 8 can be read from time to time to check that the device 1 has not been used to process other rolls of plastic.

The wheel 8 can also be used to determine whether there are problems with the passage of the plastic.

The way in which the sealing unit 10 operates will be described in more detail with reference to FIG. 3. The sealing unit 10 shown in FIG. 3 comprises a section 20 which is fixedly connected to the housing 2. A baseplate 21 is secured to this section 20. This baseplate 21 is connected to a section 20 via the rotation point 22. Furthermore, a member 23 made from a heat-resistant material, such as for example ceramic or teflon, is positioned on the baseplate. A resistor is clamped to a section of the outer wall of the element 23. This resistor extends from a starting point at reference numeral 25, via a first intermediate point at reference numeral 26, to a further intermediate point at reference numeral 27 and finally an end point at reference numeral 28. The resistor (which is diagrammatically indicated by the dashed line in FIG. 3) consists, for example, of resistor material which is generally known in the part art.

This resistor material has the particular feature that the resistance of the material scarcely changes as a result of increases in temperature of the material. The slight change in the resistance which occurs during use can be measured and is an indication of the temperature of the material.

At the first section, between the reference numerals 25 and 26, and at the last section, between the reference numerals 27 and 28, the resistor material is provided with a material of relatively good conductivity. This material may, for example, comprise copper or nickel. The resistor material is not coated between the reference numerals 26 and 27. The presence of the coatings will cause the resistor material to be heated to a lesser extent over the section 25, 26 and over the section 27, 28 than over the section between the reference numerals 26 and 27. The temperature of the resistor material over the section between the reference numerals 25 and 26 is typically 70 to 75° C. The temperature of the material over the section between the points 26 and 27 is typically 100 to 170° C. In the section between the points 27 and 28, the temperature will drop again to typically 75° C. It can be seen from FIG. 3 that, in addition to the element 23, there is also a second element 23' which is arranged directly on the housing 2 of the device. The structure of the element 23' is otherwise identical to that of the element 23. In addition to the elements 23, the sealing unit 10 also comprises a first rubber wheel 24 and a second wheel 24'. The wheel 24, just like the element 23, is arranged on the baseplate 21 and can therefore rotate about the pivot point 22. The opposite wheel 24' is fixedly connected to the housing 2. In FIG. 3, the wheels 24 and 24' are shown to be slightly overlapping. Since the wheels are made from a resilient material, the wheels will be deformed slightly under the influence of one another.

A belt or strip 40 is arranged around the wheel 24 and the associated element 23. This belt or strip is formed, for example, from teflon. In the same way, a belt or strip 40' is arranged around the element 24' and the associated element 23'. In use, plastic is supplied from the right-hand side as seen in FIG. 3, from the position denoted by A. The plastic then moves toward the point which is denoted by B. While it is being conveyed from position A to position B, the plastic is heated with the aid of the resistors which are arranged around the elements 23 and 23'. The plastic which is guided through the sealing unit 10 cannot stick to these resistors, since they are separated from the resistors by means of the strips 40 and 40'. The strips 40 and 40', together with the plastic which is to be sealed, move past the heating elements which are arranged on the elements 23 and 23'.

When the plastic which is to be sealed is passing through the sealing unit 10, not only the plastic which is to be sealed but also the material of the strips 40 and 40' is heated. When the strips 40, 40' are located at point B in the sealing unit 10, the material of the strip 40, 40' will be conveyed back to the starting point A. During this conveying, the temperature of the strips 40, 40' will drop and the temperature will seek to adopt ambient temperature. If no special measures were to be taken, it would be necessary to increase the temperature of the material of the strips 40, 40' again from position A in order for them to be able to transfer heat to the plastic which is to be sealed. If this were to be the case, excess heat would have to be supplied to the material of the strips 40, 40' over the section A–B in order to ensure that the material which is to be sealed can be sealed in a relatively short time over a relatively short distance. However, if too much heat is supplied, what is known as a hot spot is formed on the resistor material at the location of reference numeral 27. This is because at this position the resistor material can no longer transfer heat to the material which is to be sealed, while a relatively high temperature is maintained at this location. At this hot spot, the excess supply of heat may lead to the plastic which is to be sealed flowing, which can cause leaks at the sealed joint which is applied.

According to the invention, the specific design of the sealing unit 10 means that the following occurs:

After it has left position B, the temperature of the material of the strips 40, 40' drops slightly. After it has passed the reference numeral 25, the material of the strips 40, 40' will come into contact with the resistor material, which is at a relatively low temperature over section 25–26. As it moves from position 25 to position 26, the material of the strips 40, 40' will adopt the temperature of the resistor material. After it has passed the reference numeral 26, the temperature of the material of the strips 40, 40' is increased further, i.e. the material of the strips 40, 40', when these strips reach the point A, will already have adopted the temperature of the resistor material. This means that all the heat which is supplied over the section A-27 benefits the layers of material which is to be sealed. This means that there is no need for excessive heat to be supplied to the material and that a reliable weld can be formed between the materials which are to be sealed.

Figure 3:
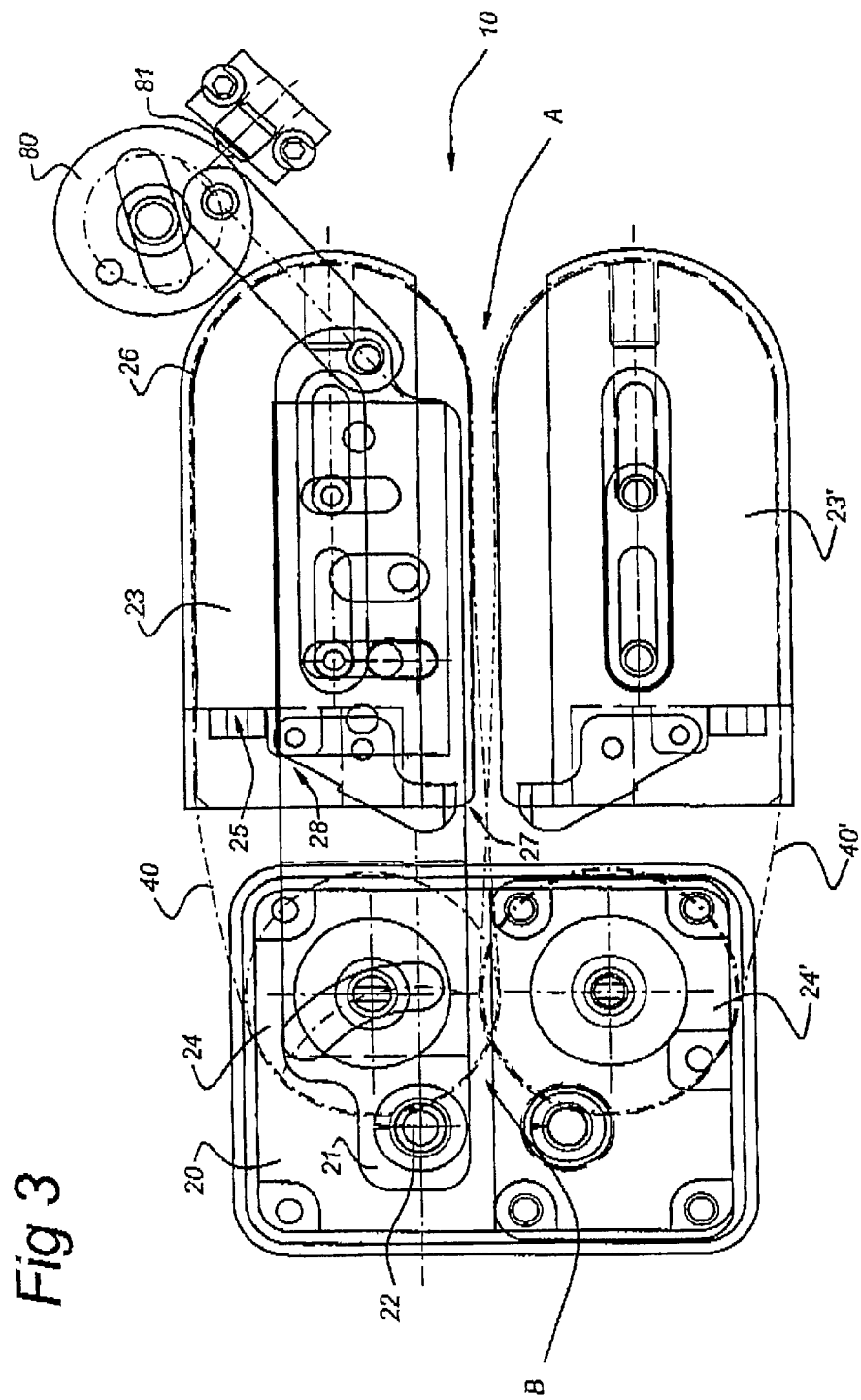
FIG. 3 shows a detailed view of the sealing section of the sealing device shown in FIGS. 1 and 2.

The design which is shown in FIG. 3, in which at least one element 23 and a corresponding wheel 24 are arranged on a baseplate 21, makes it possible to rotate the baseplate 21 with respect to the housing 2. This means that space becomes available for displacement of any layers of plastic which could be present between the elements 23 and 23'. Furthermore, after the baseplate 21 the sealing wires are accessible and can be replaced if necessary.

According to FIG. 3, the rotation of the baseplate 21 is effected by means of a wheel 80. Rotation of the wheel 80 causes the element 23 to move from an active position for sealing plastic into an inactive position at a distance from the opposite block 23'. The wheel 80 may be provided on the top side with notches into which a fixing member 81 can be pressed.

Gears are arranged on the axle 22 in the centre of the wheel 24. These gears are not shown, for the sake of clarity of the figure. These gears are and continue to be in engagement while the plate 21 is rotating about the axle 22. This measure ensures that when the plate 21 is being rotated back, the teeth of the gear whose axis of rotation coincides with that of the wheel 24 cannot become jammed on the teeth of the gear whose axis of rotation coincides with the wheel 24'.

FIG. 4 again depicts the device 1 shown in FIG. 1. It can be seen from FIG. 4 that a roll 50 on which plastic 51 has been wound has been placed onto the storage holder 3. The plastic 51 is guided towards the sealing element 10 via the guide element 5. In view of the fact that the plastic 51 comprises a closed tube which is cut open just in front of outlet opening 7, it is possible, with the aid of the outlet opening 7, to blow air into the material of the plastic 51. This means that the volume of the strip which is guided through the device 1 increases. Just after it has left the outlet opening 7, the strip of plastic 51 enters the sealing unit 1, where it is sealed as described with reference to FIG. 3. The end product guided out of the device 1 is a strip 51 which comprises a succession of air pockets which together form a strip. These air pockets can be used as packaging material, for example for packaging fragile goods.

The packaging material which is formed with the aid of the device 1 can be used to replace what are known as packaging chips. Packaging chips are a material in which air is enclosed in a polymer structure. Production, transportation and storage of such packaging chips requires a relatively large amount of space. According to the invention, it is provided that the air is only blown into the packaging material just before the packaging material is used. This means that it is only necessary to stock storage rolls 50 which take up a limited volume yet provide relatively large amounts of packaging material.

FIG. 5 shows a plan view of the device according to the invention while a strip of plastic 51 is being sealed. It can be seen from FIG. 5 that the tubular film 51 extends between the end edges 52 and 53. Transverse seams 54 and 55 extend from the end edge 52 in the direction of the end edge 53. Between the end of the seams 54 and 55 and the end edge 53, there is an opening, with the aid of which the tube 51 can be pushed over the guide 6. It can also be seen from FIG. 5 that the tube 51, upstream of the sealing device 10, is at an angle with respect to the direction of passage through the said sealing device 10. As a result, the end edge 53 is under a certain tension and is therefore held taut.

When the tube 51 is passed through, the end edge 53 is cut open with the aid of a blade 61. The tube 51 is then connected to the air supply 7 with the aid of which the tube is inflated. This can be seen in detail from FIG. 6. Immediately after the tube 51 has been inflated, the tube is sealed with the aid of the sealing device 10, so that the air in the tube 51 is enclosed by the end edge 52, a transverse seam 54, a downstream transverse seam 55 and the newly formed sealed seam 56.

What is claimed is:

1. Sealing device for using heat to form a weld between a first layer of plastic and a second layer of plastic, provided with heating means for heating the layers of plastic and conveyor means for conveying the layers of plastic past the heating means, and separation means for forming a separating layer between the heating means and the layers of plastic while the latter are being heated, the separation means being displaceable in the direction of movement of the layers of plastic past the heating means, characterized in that preheating means are provided for the purpose of preheating the separation means before they are fed to the heating means.

2. Device according to claim 1, characterized in that the heating means form a guide for the separation means, the heating means comprising a first section for preheating the separation means which adjoins a second section for heating the layers of plastic.

3. Device according to claim 2, characterized in that the preheating means comprise a first section for bringing the separation means up to the correct temperature, which first section adjoins a second section for further increasing the temperature of the separation means.

4. Device according to claim 1, characterized in that the separation means form a belt or strip which can be displaced along the heating means.

5. Device according to claim 4, characterized in that the belt or strip comprises teflon.

6. Device according to claim 4, characterized in that the belt or strip is of endless design.

7. Device according to claim 1, characterized in that the heating means are designed as a resistor.

8. Device according to claim 7, characterized in that the resistor has a first section having a first resistance and a second section having a higher resistance, in order, in use, to form a first section which is at a relatively low temperature and a second section which is at a relatively high temperature.

9. Device according to claim 8, characterized in that the resistor has a core of resistor material, the first section being coated with a conductive material in order to reduce the resistance at the location of the coating.

10. Device according to claim 9, characterized in that the coating comprises nickel or copper.

11. Device according to claim 1, characterized in that the device comprises first heating means and second heating means, which heating means are positioned opposite and at a distance from one another, so that a passage for the layers of plastic which are to be joined is formed between them.

12. Device according to claim 11, characterized in that one of the heating means can be displaced from an active position into an inactive position.

13. Device according to claim 1, characterized in that the heating means are designed as a strip or wire which is secured to a base surface, the wire projecting out of the base surface and the projecting section of the wire being smaller than the overall thickness of one of the plastic layers.

14. Device according to claim 1, characterized in that the conveyor means are arranged downstream of the heating means.

15. Device according to claim 14, characterized in that the conveyor means comprise pressure-exerting rollers which are arranged in line with the heating means.

16. Device according to claim 1, characterized in that the device has a supply path for the layers of plastic, which supply path comprises a turn or bend upstream of the heating means.

17. Device according to claim 16, characterized in that the layers of plastic are supplied from a storage holder or roll, via a guide, the longitudinal axis of the said guide forming an angle of less than 90° with the longitudinal direction of the heating means.

18. Device according to claim 17, characterized in that the angle between the longitudinal direction of the heating means and the axis of rotation is substantially 85°.

19. Device according to claim 1, characterized in that the device comprises a spindle on which a roll of plastic can be placed, which spindle has a first projecting end and a second end, with the aid of which the spindle is secured to the device, the spindle being provided, at the first end, with a conically shaped member with a diameter which increases from the first end towards the second end, and the spindle also having, at a distance from this end, a second conical member with a diameter which increases, as seen from the first end towards the second end, a section of the spindle of relatively small diameter being present between the two conical members.

20. Device according to claim 1, characterized in that means are provided for feeding air between the layers of plastic which are to be joined, which means comprise an outlet opening, the outlet opening decreasing in size in the direction of movement of the layers of plastic.

21. Method for joining a first layer of plastic and a second layer of plastic to one another by means of heat, the layers of plastic being moved past stationary heating means, and separation means being arranged between the heating means and the layers of plastic while they are being conveyed past the heating means, characterized in that the separation means are preheated before they are fed to the heating means.

* * * * *